United States Patent
Baladi et al.

(10) Patent No.: US 12,291,344 B2
(45) Date of Patent: May 6, 2025

(54) AIRCRAFT PERFORMANCE OPTIMIZATION BASED ON ENGINE PERFORMANCE MONITORING

(71) Applicant: GE Avio S.r.l., Rivalta di Torino (IT)

(72) Inventors: Mehdi M. Baladi, Cincinnati, OH (US); Aniello Esposito, Turin (IT); Sridhar Adibhatla, Glendale, OH (US); Kathleen K. Collins, Lynn, MA (US)

(73) Assignee: GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 18/410,493

(22) Filed: Jan. 11, 2024

(65) Prior Publication Data

US 2024/0208660 A1 Jun. 27, 2024

Related U.S. Application Data

(62) Division of application No. 17/471,774, filed on Sep. 10, 2021, now abandoned.

(30) Foreign Application Priority Data

Sep. 30, 2020 (IT) .......................... 102020000023104

(51) Int. Cl.
*B64D 31/06* (2024.01)
*B64D 33/02* (2006.01)
(Continued)

(52) U.S. Cl.
CPC ............. *B64D 31/06* (2013.01); *B64D 33/02* (2013.01); *B64D 45/00* (2013.01); *F02C 9/00* (2013.01);
(Continued)

(58) Field of Classification Search
CPC ....................... B64D 45/00; B64D 2045/0085; B64D 33/00; B64D 33/02; B64D 33/06;
(Continued)

(56) References Cited

U.S. PATENT DOCUMENTS

3,129,428 A 4/1964 Chase
3,344,606 A 10/1967 Abernethy
(Continued)

FOREIGN PATENT DOCUMENTS

CN 106468219 3/2017
CN 106907345 6/2017
(Continued)

OTHER PUBLICATIONS

U.S. Appl. No. 17/471,774; Final Rejection mailed Oct. 17, 2023; (pp. 1-21).
(Continued)

*Primary Examiner* — Alain Chau
(74) *Attorney, Agent, or Firm* — Fitch, Even, Tabin & Flannery LLP

(57) ABSTRACT

A system and method for optimizing performance of an aircraft or boat through detection and trending of engine deterioration based on the performance of the vehicle's gas turbine. The system and method detects declines in engine power due to either of in-transit events or over the extended lifetime of the engine, the declines being due to routine engine part aging or an event. As engine power gradually or suddenly deteriorates, the system and method lowers a maximum operating line which defines the safe limits for peak engine power consumption during flight. For in-transit events, the system and method detects when actual power consumption is approaching the current maximum operating line. The controller may then automate changes to operations of entirely separate aircraft systems, such as rebalancing electrical energy consumption by various non-engine elements of the aircraft.

15 Claims, 8 Drawing Sheets

(51) Int. Cl.
*B64D 45/00* (2006.01)
*F02C 9/00* (2006.01)
*G08G 5/00* (2006.01)

(52) U.S. Cl.
CPC ..... *G08G 5/003* (2013.01); *B64D 2033/0273* (2013.01); *B64D 2221/00* (2013.01)

(58) Field of Classification Search
CPC .......... B64D 2221/00; F02C 9/00; F02C 9/18; F05D 2260/80; F05D 2260/82; F05D 2260/821
See application file for complete search history.

(56) References Cited

U.S. PATENT DOCUMENTS

| | | | |
|---|---|---|---|
| 6,474,935 B1 | 11/2002 | Crotty | |
| 8,126,597 B2 | 2/2012 | Bailly | |
| 8,798,848 B2 | 8/2014 | Gu | |
| 8,996,277 B2* | 3/2015 | Beecroft | F02C 9/00 700/39 |
| 9,008,943 B2 | 4/2015 | Lickfold | |
| 9,037,381 B2 | 5/2015 | Care | |
| 9,382,010 B2* | 7/2016 | Chen | F02C 9/54 |
| 9,651,457 B2 | 5/2017 | Piol | |
| 10,442,544 B2* | 10/2019 | Boyd | B64D 31/06 |
| 10,442,547 B2* | 10/2019 | Miller | B60L 3/12 |
| 10,508,597 B2* | 12/2019 | Kalya | F01D 25/10 |
| 10,604,278 B2* | 3/2020 | Adibhatla | F01D 21/14 |
| 11,500,369 B2* | 11/2022 | Funahashi | F02C 9/00 |
| 2002/0168260 A1 | 11/2002 | Crotty | |
| 2004/0070521 A1 | 4/2004 | Greene | |
| 2004/0088085 A1 | 5/2004 | Nobre | |
| 2008/0215194 A1 | 9/2008 | Bailly | |
| 2010/0161196 A1* | 6/2010 | Goericke | G05B 23/0243 701/99 |
| 2010/0280730 A1* | 11/2010 | Page | F02C 9/28 701/100 |
| 2010/0287907 A1 | 11/2010 | Agrawal | |
| 2010/0303611 A1* | 12/2010 | Kim | G01M 15/14 415/118 |
| 2013/0024179 A1* | 1/2013 | Mazzaro | F01D 17/20 703/18 |
| 2013/0179028 A1 | 7/2013 | Gu | |
| 2013/0191004 A1* | 7/2013 | Beecroft | F01D 11/08 701/100 |
| 2014/0039775 A1 | 2/2014 | Lickfold | |
| 2014/0236450 A1 | 8/2014 | Care | |
| 2014/0271117 A1* | 9/2014 | Armstrong | F01D 21/12 415/13 |
| 2014/0297155 A1* | 10/2014 | Chen | F01D 21/003 701/100 |
| 2015/0192499 A1 | 7/2015 | Piol | |
| 2015/0225089 A1 | 8/2015 | Judge | |
| 2015/0354464 A1 | 12/2015 | Hillel | |
| 2016/0281529 A1 | 9/2016 | Chen | |
| 2017/0036773 A1 | 2/2017 | Jones | |
| 2017/0175646 A1 | 6/2017 | Adibhatla | |
| 2017/0320586 A1 | 11/2017 | Boyd | |
| 2017/0324360 A1 | 11/2017 | Cline | |
| 2017/0356346 A1* | 12/2017 | Jiang | F04D 27/0292 |
| 2018/0073386 A1* | 3/2018 | Zhang | F01D 25/002 |
| 2018/0073389 A1* | 3/2018 | Zhang | F01D 21/003 |
| 2018/0297718 A1* | 10/2018 | Adibhatla | G07C 5/006 |
| 2018/0298817 A1* | 10/2018 | Kalya | F01D 25/02 |
| 2018/0340474 A1 | 11/2018 | Baladi | |
| 2018/0370651 A1 | 12/2018 | Miller | |
| 2019/0186360 A1 | 6/2019 | Sellers | |
| 2019/0277155 A1* | 9/2019 | Dowdell | F02C 9/18 |
| 2020/0278671 A1* | 9/2020 | Funahashi | G06Q 10/20 |
| 2020/0313435 A1* | 10/2020 | Yamauchi | G06Q 10/06315 |
| 2020/0347788 A1* | 11/2020 | Shepherd | G01M 13/028 |
| 2020/0392859 A1 | 12/2020 | Turner | |
| 2021/0229824 A1* | 7/2021 | Zhu | B64D 31/06 |
| 2022/0097864 A1 | 3/2022 | Baladi | |

FOREIGN PATENT DOCUMENTS

| | | |
|---|---|---|
| CN | 108952971 | 12/2018 |
| CN | 110844089 | 2/2020 |
| EP | 2955334 | 12/2015 |
| EP | 3130783 | 2/2017 |
| EP | 3184756 | 6/2017 |
| EP | 3406881 | 11/2018 |
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

OTHER PUBLICATIONS

U.S. Appl. No. 17/471,774; Non-Final Rejection mailed Apr. 11, 2023; (pp. 1-24).

* cited by examiner

AIRCRAFT PERFORMANCE OPTIMIZATION BASED ON ENGINE PERFORMANCE MONITORING

CROSS-REFERENCE TO RELATED APPLICATIONS

This application is a divisional of U.S. application Ser. No. 17/471,774, filed on Sep. 10, 2021, which claims foreign priority to Italian Patent Application No. 102020000023104, which was filed on Sep. 30, 2020, which are hereby incorporated herein by reference.

TECHNICAL FIELD

The present invention relates to optimization of aircraft performance. The present invention further relates to optimization of multiple features of aircraft performance responsive to monitoring of aircraft engine performance.

BACKGROUND

On transport vehicles, including but not limited to airplanes, it is generally known to have sensors and associated electronic processing systems which monitor various component units of the vehicle, and which further modify operating performance of a component unit in response to the monitoring. For example, on an aircraft, electronic systems will monitor performance parameters of a jet engine, and will further modify and sometimes limit engine operations (such as limiting engine speed) for reasons of operational efficiency and vehicular safety.

Aircraft are complex systems, and the performance and operations of different units (such as engines, wings, interior electronics) can have interactive and synergistic effects. However, because the different component units of a large aircraft are often made be entirely different companies, integration of component unit monitoring to achieve aircraft-wide changes in operations has not always been possible. For example, aircraft engines are often designed, engineered, and manufactured by a first corporate entity; and the engines so designed are then integrated into aircraft which are designed and built by some entirely separate corporate entity.

At the same time, it may be the case that changes in real-time performance of operations in one aircraft components, such as the engines, may be best addressed (in part or in whole) by making suitable real-time changes in the operations of entirely different units of the aircraft.

A further challenge for aircraft design, or more generally vehicular design, is that component unit performance tends to degrade over time. An aircraft engine or aircraft engine compressor with 10,000 hour of operational time may no longer perform as well as when the same engine was fresh from the factory. Or similarly, an aircraft engine/compressor which is 10,000 hours from its last maintenance may no longer perform as well as the same engine/compressor immediately after maintenance. As such, the overall design of the aircraft, and operational limitations for the aircraft, may be based on anticipated worst-case/degraded engine performance. This means the aircraft does not take advantage of the more optimal engine performance when the engine is newly built, or when the engine has just received maintenance. This results in unnecessary limitations on the performance of the aircraft during periods of peak or near-peak engine performance.

What is needed, then, is a system and method for increasing aircraft performance and safety by determining and automating modifications to aircraft operations, at a system-wide level, based on sensed changes over time to operational performance of a particular hardware subsystem such as the aircraft engines.

SUMMARY OF THE INVENTION

Controller(s): In at least one aspect, embodiments of the present system and method entail a controller which detects declines in overall engine power over the extended lifetime of the engine, the declines being due to routine engine part aging. As engine thrust and power gradually deteriorate over time periods of weeks and months, the controller recalculates—and generally reduces—a maximum operating line which defines the safe limits for peak engine power consumption during flight.

In another aspect, embodiments of the present system and method entail a controller which detects any deterioration, over time, in the performance of an aircraft engine (or other transport vehicle engines, such as boat engines). Based on the detected variations, the controller may then automate certain changes to operations of entirely separate aircraft systems, such as making changes to electrical energy consumption by various elements in the interior of the aircraft. For example, in response to reduced engine performance, the controller may limit the electricity consumed by non-essential electronics within the interior cabin of the aircraft.

In another aspect, embodiments of the present system and method may entail a controller which detects any deterioration, over time, in the performance of one element of an aircraft engine (such as the compressor). Based on the detected variations, the controller may then automate certain changes to operations of other engine elements (for example, foreign object debris (FOD) doors) which are not conventionally associated with addressing compressor performance.

In another aspect, embodiments of the present system and method may entail a controller which detects any deterioration, over time, in the performance of one element of an aircraft engine (such as the compressor). Based on the detected variations, the controller may then signal a pilot to take actions which may not typically be part of conventionally-known or conventionally taught pilot actions, but which may address operational stresses being imposed on the aircraft engines.

In another aspect, embodiments of the present system and method may entail a controller which detects any deterioration, over time, in the performance of one element of an aircraft engine (such as the compressor). Based on the detected variations, the controller may then take system-wide or aircraft-wide actions or issue pilot signals to address the degraded engine performance via system-wide actions, based on the current state of engine performance; in this way actions taken or signaled by a controller will be tuned for and responsive to current engine performance, as opposed to being tuned for or designed for anticipated, potential worst-case engine performance.

In another aspect, embodiments of the present system and method may entail a controller which detects can adjust overall aircraft performance parameters based on whether the engines are at peak or near-peak operational performance, versus times when engine performance is naturally degraded due to extended periods of engine usage.

Software: In at least one aspect, embodiments of the present system and method entail software which operates one or more aircraft controllers based on data from one or more aircraft sensors. The software detects declines in overall engine power over the extended lifetime of the engine, the declines being due to routine engine part aging. As engine thrust and power gradually deteriorate over time periods of weeks and months, the software recalculates—and generally reduces or lowers—a maximum operating line which defines the safe limits for peak engine power consumption during flight.

In another aspect, embodiments of the present system and method entail software which operates one or more aircraft controllers based on data from one or more aircraft sensors. The software detects any deterioration, over time, in the performance of an aircraft engine (or other transport vehicle engines, such as boat engines). Based on the detected variations, the software issues instructions to the controller(s) which may then automate certain changes to operations of entirely separate aircraft systems, such as making changes to electrical energy consumption by various elements in the interior of the aircraft. For example, in response to reduced engine performance, the software may limit the electricity consumed by non-essential electronics within the interior cabin of the aircraft.

In another aspect, embodiments of the present system and method may entail a controller which detects any deterioration, over time, in the performance of one element of an aircraft engine (such as the compressor). Based on the detected variations, the controller may then automate certain changes to operations of other engine elements (for example, FOD doors) which are not conventionally associated with addressing compressor performance.

In another aspect, embodiments of the present system and method may entail software which operates one or more aircraft controllers based on data from one or more aircraft sensors. The software detects any deterioration, over time, in the performance of one element of an aircraft engine (such as the compressor). Based on the detected variations, the software may then signal a pilot to take actions which may not typically be part of conventionally-known or conventionally taught pilot actions, but which may address operational stresses being imposed on the aircraft engines.

In another aspect, embodiments of the present system and method may again entail software which operates one or more aircraft controllers based on data from one or more aircraft sensors. The software detects any deterioration, over time, in the performance of one element of an aircraft engine (such as the compressor). Based on the detected variations, the software may then issue instructions to the controller to take system-wide or aircraft-wide actions, or the software, via suitable interfaces, may issue pilot signals to address the degraded engine performance via system-wide actions, based on the current state of engine performance; in this way actions taken or signaled by a software will be tuned for and responsive to current engine performance, as opposed to being tuned for or designed for anticipated, potential worst-case engine performance.

In another aspect, embodiments of the present system and method may again entail software which operates one or more aircraft controllers based on data from one or more aircraft sensors. The software is configured to adjust overall aircraft performance parameters based on whether the engines are at peak or near-peak operational performance, versus times when engine performance is naturally degraded due to extended periods of engine usage.

For example, in response to reduced engine performance, the software may limit the electricity consumed by non-essential electronics within the interior cabin of the aircraft.

Methods: In another aspect, embodiments of the present system and method may entail various methods of aircraft control, implemented via controllers, software, firmware, and similar technologies, the methods implementing the operations and activities discussed immediately above with respect to controllers and software embodiments.

BRIEF DESCRIPTION OF THE DRAWINGS

Advantageous designs of embodiment of the present invention result from independent and dependent claims, the description, and the drawing. In the following, preferred examples of embodiments of the invention are explained in detail with the aid of the attached drawings:

DETAILED DESCRIPTION OF EXEMPLARY EMBODIMENTS

The following detailed description is merely exemplary in nature and is not intended to limit the system and methods, nor the elements or steps of the system and method, nor its applications, and its uses disclosed herein. Further, there is no intention for the scope to be bound or limited to or by any theory presented in the preceding background or summary, nor in the following detailed description.

I. Terminology

It will be understand in this document that:

Description of various embodiments may use "comprising" language, indicating that the system and method may include certain elements or steps which are described; but that the system and method may also include other elements or steps which are not described, or which may be described in conjunction with other embodiments, or which may be shown in the figures only, or those which are well known in the art as necessary to the function of processing systems. However, it will be understood by one of skilled in the art that in some specific instances, an embodiment can alternatively be described using the language "consisting essentially of" or "consisting of."

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

II. Exemplary Aircraft

Figure 1:
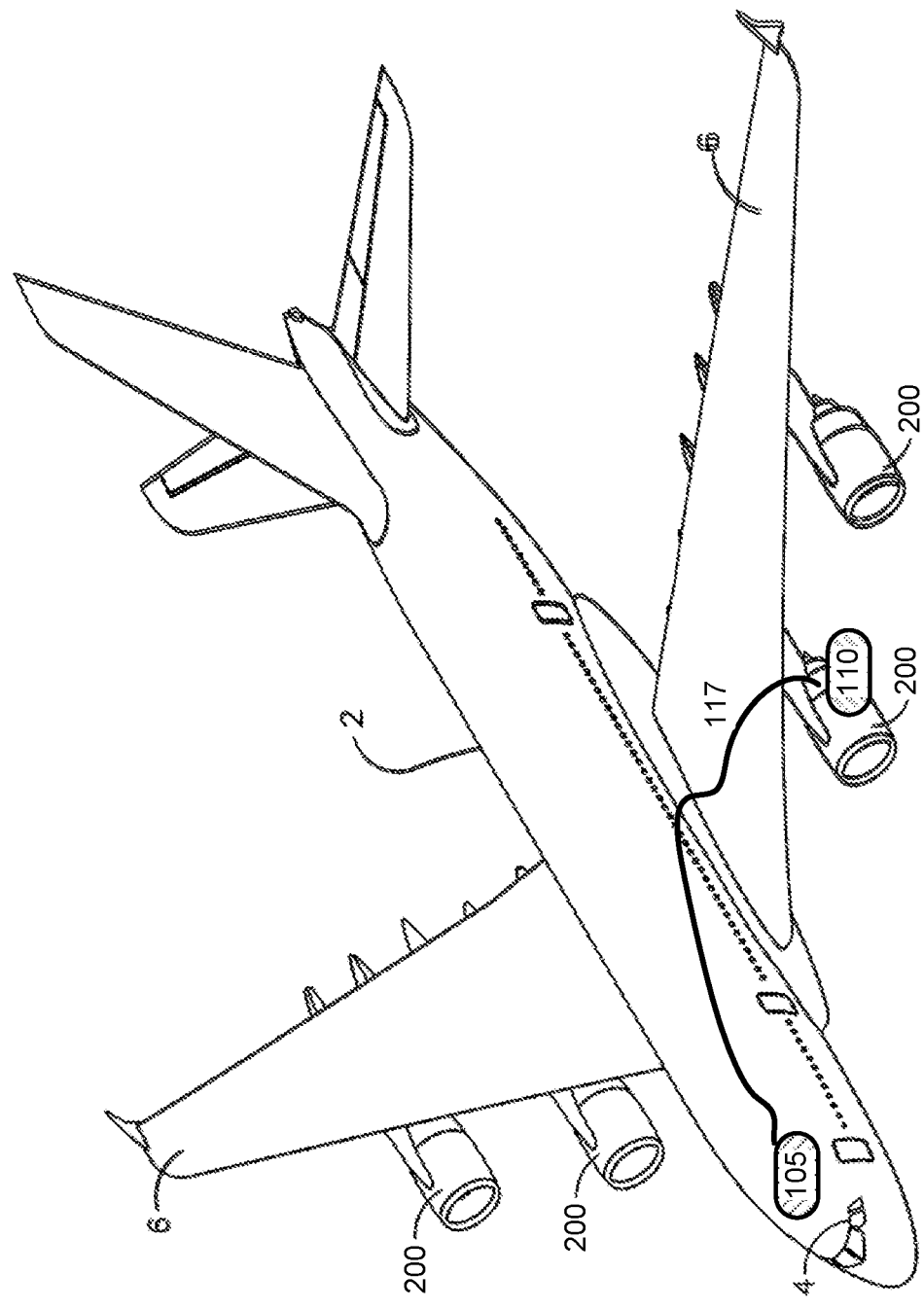
FIG. 1 is a schematic perspective diagram of an exemplary aircraft including an exemplary turbine engine 200.

FIG. 1 illustrates an exemplary aircraft 100 according to the present system and method. Aircraft 1 may include a fuselage 2, a cockpit 4 positioned in the fuselage 2, and wing assemblies 6 extending outward from the fuselage 2. The aircraft 100 can also include multiple engines 10, including turbine engine 200s 200 which by way of non-limiting example can be turbojet, turbofan, turboprop, or turboshaft engines. While a commercial fixed wing aircraft 100 has been illustrated, it is contemplated that aspects of the disclosure described herein can be used in any type of fixed wing, rotary wing, or convertible wing aircraft such as the V22 Osprey in a non-limiting example. Further, while two turbine engine 200s 200 have been illustrated on each of the wing assemblies 6, it will be understood that any number of turbine engine 200s 200 including a single turbine engine 200 200 on the wing assemblies 6, or even a single turbine engine 200 200 mounted in the fuselage 2 can be included. In an example where the aircraft 100 includes a rotary wing aircraft, multiple fuselage mounted turbine engine 200s can be included in the aircraft 100.

Controllers and Avionics: The aircraft 100 may include one or more general aircraft controllers 105, together referred to as the avionics suite 105, which may be digital controllers with microprocessor(s) and memory. Ad discussed further below, the aircraft engines 200 may include one or more engine controllers 110 which may be Full Authority Digital Controllers 110 (FADECS). Suitable internal communications links 117 (electrical, fiber optic or wireless) enable digital and possibly analog communications between the avionics suite 105 and the FADECS 110.

The present system and method is particularly applicable to relatively smaller commercial jet airplanes which are still in widespread use, but may be applicable to larger commercial aircraft, military aircraft, helicopters, and boat engines as well. The illustration and exposition here of the present system and method with turbine engine 200s for aircraft is exemplary only, and should not be construed as limiting.

Figure 2:
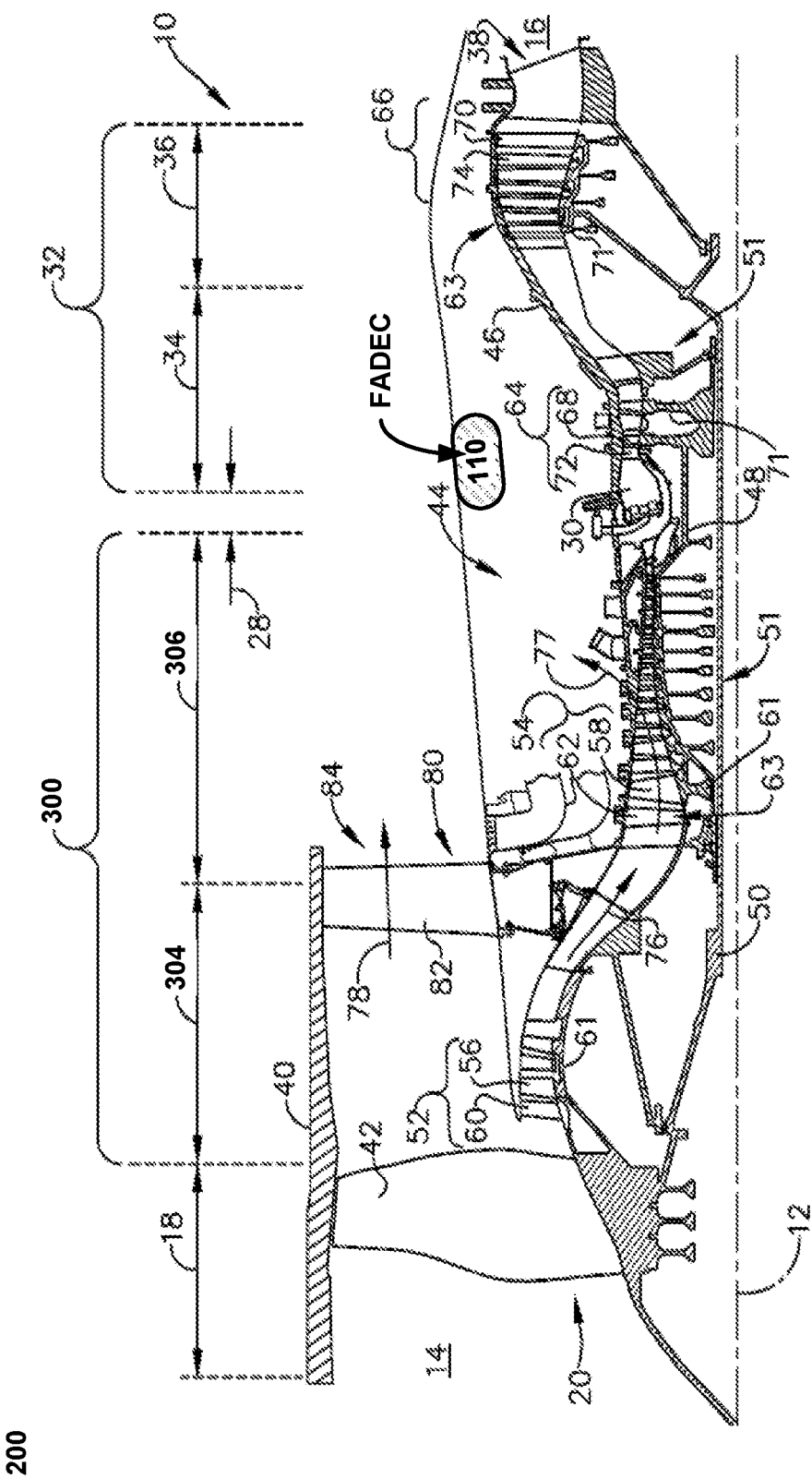
FIG. 2 is a schematic cross-sectional diagram of the exemplary turbine engine 200 of FIG. 1 including an exemplary turbine engine 200 compressor.

Turning to FIG. 2, the turbine engine 200 200 has a generally longitudinally extending axis or centerline 12 extending forward 14 to aft 16. The engine 200 includes, in downstream serial flow relationship, a fan section 18 including a fan 20, a compressor section 300 including a booster or low pressure (LP) compressor 304 and a high pressure (HP) compressor 306, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 306, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 200 drivingly connects the HP turbine 34 to the HP compressor 306. A LP shaft or spool 50, which is disposed coaxially about the centerline 12 of the engine 200 within the larger diameter annular HP spool 48, drivingly connects the LP turbine 36 to the LP compressor 304 and fan 20. The spools 48, 50 are rotatable about the engine centerline and couple to a plurality of rotatable elements, which can collectively define a rotor 51.

The LP compressor 304 and the HP compressor 306 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 300, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 304, which then supplies pressurized air 76 to the HP compressor 306, which further pressurizes the air. The pressurized air 76 from the HP compressor 306 is mixed with fuel in the combustor 30 and ignited, thereby generating combustion gases. Some work is extracted from these gases by the HP turbine 34, which drives the HP compressor 306. The combustion gases are discharged into the LP turbine 36, which extracts additional work to drive the LP compressor 304, and the exhaust gas is ultimately discharged from the engine 200 via the exhaust section 38. The driving of the LP turbine 36 drives the LP spool 50 to rotate the fan 20 and the LP compressor 304.

A portion of the pressurized airflow 76 can be drawn from the compressor section 300 as bleed air 77. The bleed air 77 can be drawn from the pressurized airflow 76 and provided to engine components requiring cooling. The temperature (T) of pressurized airflow 76 entering the combustor 30 is significantly increased. As such, cooling provided by the bleed air 77 is necessary for operating of such engine components in the heightened temperature (T) environments.

A remaining portion of the airflow 78 bypasses the LP compressor 304 and engine core 44 and exits the engine assembly 200 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Electrical Power and Cooling: Some of the air supplied by the fan 20 can bypass the engine core 44 and be used for cooling of portions, especially hot portions, of the engine 200, and/or used to cool or power other aspects of the aircraft 100. Electrical power for the aircraft 100 can be provided by one or more electrical generators which obtains rotary power from the rotor 51 of engine 100. See FIG. 4 for additional discussion.

In the context of a turbine engine 200, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 304 or the HP compressor 306.

Figure 3:
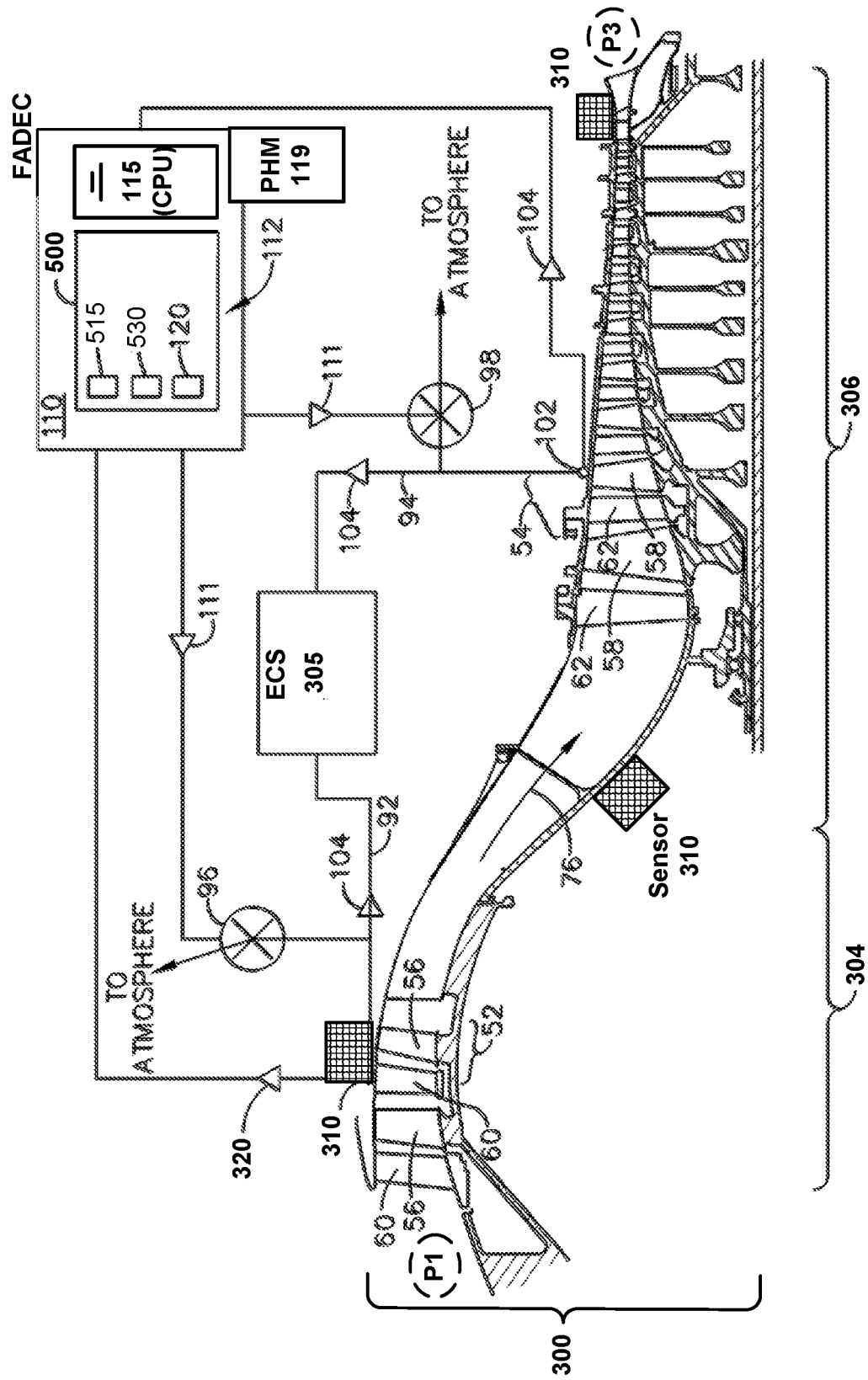
FIG. 3 is a schematic cross-sectional diagram of the exemplary engine compressor of FIG. 2 including an exemplary environmental control system (ECS) and controller.

Turning to FIG. 3, the compressor section 300 can include an LP bleed air line 92 fluidly connected to the stage 52 of the LP compressor 304, and an HP bleed air line 94 fluidly connected to the stage 54 of the HP compressor 306. An LP dump valve 96 can be coupled to the LP bleed air line 92, and an HP dump valve 98 can be coupled to the HP bleed air line 94 as shown, where the dump valves 96, 98 can be fluidly connected to atmosphere external to the aircraft 1 (FIG. 1). It will be understood that the stages 52, 54 to which the bleed air lines 92, 94 are connected are exemplary and can be any stages within the LP compressor 304 and HP compressor 306, respectively.

The aircraft 100 (FIG. 1) can further comprise an environmental control system (ECS) 305 and ECS sensors 310, which can be positioned anywhere within the engine 200 and are illustrated in FIG. 3 as positioned at the stages 52, 54 of the compressors 304, 306. It will be understood that the ECS 305 can manage cabin air supply as well as other factors, such as air pressurization or cabin temperature, in non-limiting examples. The ECS sensors 310 can sense an engine operating parameter including, but not limited to, engine horsepower, engine horsepower extraction, environmental control system bleed, foreign object debris door deployment, or a secondary engine parameter including, but not limited to, engine age, transient effects, temperature effects, minimum airspeed, altitude, attitude, engine inlet distortion, or inclement weather conditions, and it should be appreciated that the sensed parameters can also indicate a demand for the use of bleed air from the compressors 304, 306. It will be understood that at least one of the above-listed parameters may be sensed by the sensors 310, or at least four, or all of the parameters, or any desired combination, in non-limiting examples. It will further be understood that other aircraft or engine parameters which can impact operability of the aircraft 1 may also be sensed by the sensors 310.

Engine Controller or FADEC: An engine controller 110 (which can be a full authority digital engine controller, or "FADEC") can also be included in the turbine engine 200 200. An ECS signal 320 communicating the sensed parameter can be sent from the sensors 310 to the ECS 305 or the controller 110, and a controller signal 111 can be sent from the controller 110 to the dump valves 96, 98 or to other components (not shown) of the engine in operation.

The engine controller 110 can include a hardware microprocessor 115 (or CPU 115) and long-term and/or short-term memory 112.

Compressor Map and Stall Margin representation (see also FIG. 5A and FIG. 5B below for further discussion): A compressor map 500, which is used by the controller 110 to operate the engine 200, can be stored in the memory 112. The compressor map 500 can include storage of data representations for a compressor stall line 515, an operating line 530, and a stall margin 570. As used herein, the compressor stall line 515 will refer to the pressure ratio 502 beyond which the airflow through the engine 200 can break down or become unstable, causing an engine stall; and "operating line" 530 or "maximum transient operating line" 530 will refer to the operating pressure ratio 502 which can safely be below that of the stall line.

For purposes of this document and the appended claims, the following terms are deemed equivalent: "operating line", "operating power", "operating load", and "operating HPx". For example, the terms "maximum transient operating line 530", "maximum transient operating power 530", "maximum transient operating load 530" and "maximum transient operating HPx" are deemed equivalent terms. For another example, the terms "allowed operating line", "allowed operating power", "allowed operating load" and "allowed operating HPx" are deemed equivalent terms.

Pressure Ratio and Engine Power: The "pressure ratio" can refer to any of the following in non-limiting examples: the ratio 502 (=P2/P3 or =P3/P2) of air pressures taken at the inlet and outlet of the compressor section 300, the ratio 502 (=P2/P3 or =P3/P2) of air pressures taken at the inlet and outlet of the compressors 304, 306 individually, or the ratio 502 (=P2/P3 or =P3/P2) of air pressures taken at any two locations within the compressor section 300 as desired such as the exemplary P2, P3 measurement locations shown in the figure. The pressure ratio 502 P3/P2 may also be understood as one measure of the engine power actually being generated during flight.

Stall Margin: The stall margin 570 can be defined as the difference between the compressor stall line 515 and maximum transient operating line 530, and it should be understood that the percent difference between the compressor stall line 515 and operating line 530 can also be used to define a minimum allowed stall margin 570.

In legacy engines 200, the stall line maximum transient operating line 530 is set based on a fixed-value, maximum safety factor stall margin 570, which assumes worst case operating conditions for the aircraft and which leads to a corresponding large stall margin. All other factors being equal, the greater the stall margin 570, the less efficiently the engine 200 is operating. The present system and method is operative, in some embodiments, to safely reduce the stall margin and thereby increase engine efficiency. See further discussion associated with FIG. 5 and other discussion below.

III. Exemplary Aircraft Systems Other than the Engine

Discussed above (FIGS. 2 and 3) are the engines 200 and engine compressor 300 of an aircraft 100. As is well known in the art (as well as to aircraft pilots and passengers), an aircraft 100 contains numerous operational components, sections, and systems 400 apart from the engines 200. There are referred to herein as Aircraft Systems Other Than The Engine (ASOTE) 400. In various embodiments, the present system and method adaptively maintains the demands on aircraft engines 200 to stay within safe limits, taking advantage of the presence of these ASOTE 400. In response to wear and degradation of the engines 200 over time, the present system and method adaptively rebalances the energy, the bleed, and the power requirements of ASOTE 400 to optimize the power demands on the engines 200. Rebalancing a power demand, whether for an aircraft system or subsystem, or for the entire aircraft, may in some embodiments entail reducing a power demand, such as reducing an electrical by an aircraft system. In alternative embodiments, rebalancing a power demand (such as an electrical power demand) may entail reducing a power demand on one aircraft system or subsystem while increasing a demand on another. In some instances, rebalancing a power demand may entail increasing a power demand, such as an electrical power demand, by at least one system or subsystem of the aircraft 100.

Figure 4A:
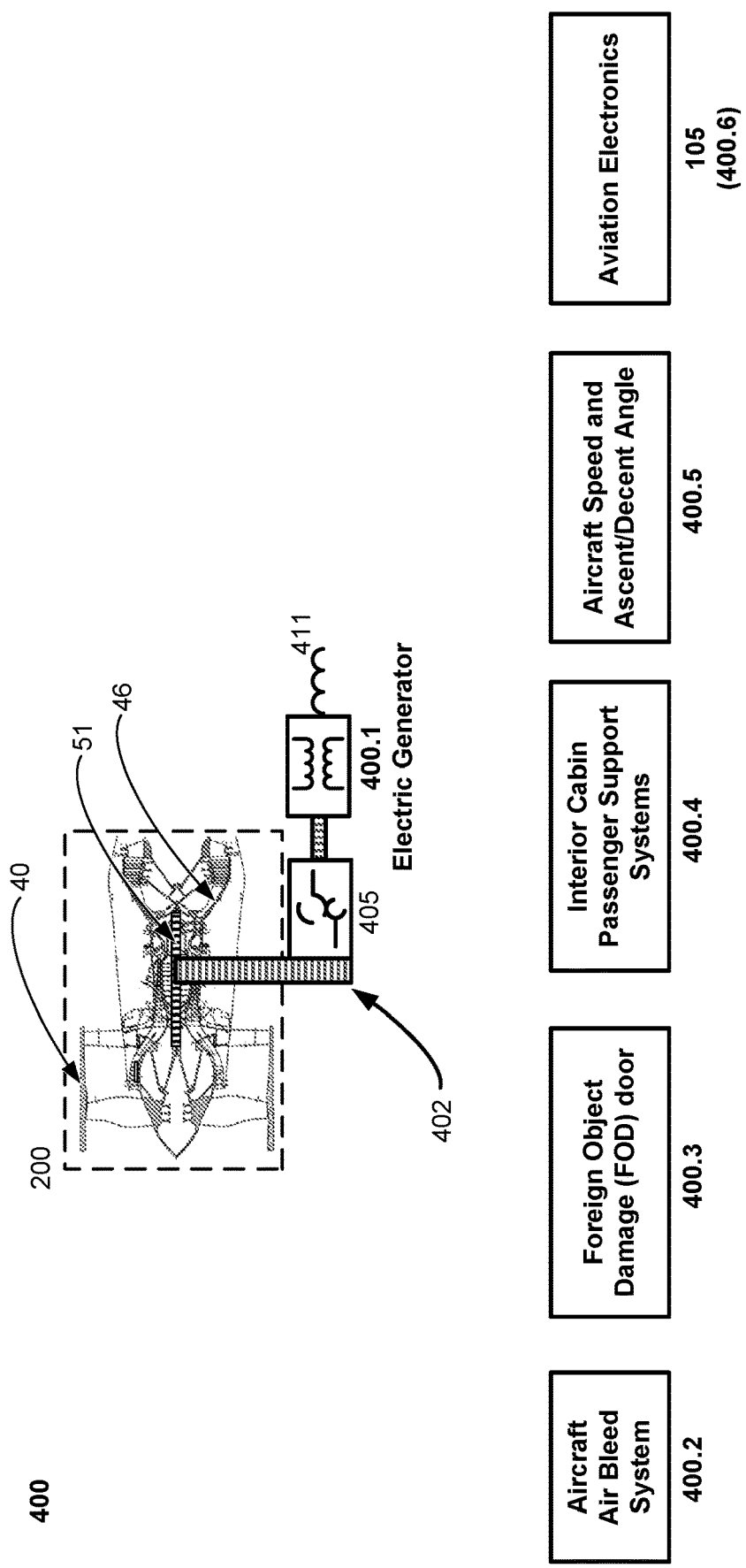
FIG. 4A illustrates some exemplary aircraft systems other than the engines (ASOTE).

FIG. 4 illustrates a handful of the numerous ASOTE 400 which are typical of many if not most exemplary aircraft 100. It will be appreciated by persons skilled in the arts that some ASOTE 400, while not part of the engines proper, are most conveniently mounted on or within the engines 200. This may be true, for example, of generators, fuel pumps, and other aircraft elements which may receive rotary power directly from the engines 200. The ASOTE 400 illustrated in FIG. 4 and discussed herein are exemplary only; in various embodiments, the present system and method may be implemented with controlled modifications to the operations of many different ASOTE. Exemplary ASOTE may include, for example and without limitation:

One or more electrical generators 400.1: A radial drive train 402 or gear shaft 402 may take rotary power from the engine rotor 51, and transfer the rotary power to an accessory gearbox (AGB) 405 (also referred to as an accessory drive section 405). The accessory gearbox 45 in turn provides rotational power for the one or more electrical generators 400.1, which can then provide electrical power 411 to other powered components and functions of the aircraft 100, including power for the wings 6 (control of flaps, etc.) and for the interior cabin 2 and cockpit 4. It will be noted that in FIG. 4 the gearbox 405 and generators 400.1 are not shown to scale with the engine 200 (which is included in the figure to provide context only). It will be further noted that while the gearbox 405 and generators 400.1 may be mounted interior to the engine 200 (possibly on either of fan casing 40 or core casing 46, the generator 400.1 is not considered to be part of the engine 200; the generator 400.1 is an exemplary ASOTE. (Aircraft 100 may also include a separate generator which provides electrical power to the engine 200 itself; in various embodiments, such an engine electrical generator (not shown in the figures) may be considered part of the engine.)

It will be noted that if too much electrical power is generated by the generators 400.1, engine airflow through the compressors and engine thrust may be reduced. If the general environment and operating conditions have placed the engines of risk of stalling, a temporary reduction in the power demands on the generators 400.1 may restore a sufficient margin of safety to avoid engine stalls.

Aircraft Air Bleed System 400.2: Aircraft bleed systems 400.2 are used to "bleed" or remove excess air pressure from the aircraft cabin 2, or to increase air pressure, as necessary.

Foreign Object Debris (F.O.D.) Door 400.3:—A mechanical separator that separates rocks or clouds of the air. Foreign objects are understood to be material objects which may be in the air in front of the aircraft 100, and which pose a risk of damaging the engines 200 if drawn into the fore of the engine 200. The FOD door 400.3 provides a pathway and mechanism for ejection of small foreign objects which may be drawn into the engines 200 during operation.

A disadvantage of using the FOD doors 400.3 is that the doors 400.3 may divert some of the air pressure inside the engine 200, which in turn reduces the power that can be generated by the engines and places increased wear on the engines (and in particular on the compressors 300); under extreme circumstances, using the FOD doors 400.3 may increase the risk of stalling. In many aircraft, the FOD doors 400.3 may be opened or closed (under pilot or aircraft control), and the amount of air diverted may be regulated over some range.

Interior cabin passenger support systems 400.4: The interior cabin passenger support systems include any electronics which may contribute to passenger comfort and convenience. These systems may include, for example and without limitation: cabin lighting, air-to-ground communications systems, temperature regulation, cooking and refrigeration systems, and other systems which draw electricity.

Aircraft electricity is provided by electric generators 400.1. In some flight situations, then, it may be beneficial to temporarily reduce overall electrical demands by cabin systems by temporarily placing limits on those demands (for example, reducing the intensity of cabin lighting, turning off cabin video displays, suspending ground-to-air communications systems for passengers, deactivating microwave ovens, reducing the demands of food refrigeration, etc.).

Aircraft Speed and Ascent/Descent Angle 400.5: Making an aircraft accelerate, and increasing the altitude or ascent angle of an aircraft 100, both demand substantial engine power. Limits can be placed on the maximum velocity, maximum acceleration, and maximum ascent angle for an aircraft, in order to reduce the maximum demands on the engines 200. In some cases, limits on deceleration and/or angle of descent may also contribute to constraining the maximum power loads on an aircraft.

Aviation Electronics 105 (400.6): Aircraft electricity for control and aviation purposes is also provided by electric generators 400.1 to avionics 105. Such avionics control systems 105 may not be broadly amenable to significant power reductions because they are required for routine flight operations and safety. Nonetheless, aircraft engineers may identify some elements of airplane avionics 105 where some limits may be safely placed on their power demands. Such limitations can be designed/selected with the criteria that while they might reduce flight efficiency, they do not reduce flight safety. Any such limitations, when invoked by the present system and method, contribute to reducing the power demand on the engines 200.

IV. Overview of the Present System and Method

The present system and method pertains to the use of one or more electronic controller systems which may be employed to maintain power consumption gas turbine engine 200s 200 within safe limits. Typical of such gas turbine engine 200s 200 are the jet engines used on modern aircraft such as turbo-propeller engines. However, the present system and method also has applications for airplanes employing turbofan or turbojet engines. The present system and method also has applications for turbine engine 200s 200 and system controllers of helicopters 100, and also for shipboard (that is, maritime) applications as well.

It will be noted in particular that the "one or more controller systems" described here may include not only an electronic controller of a turbine engine 200 200, but also other electronic controllers for other element of an aircraft or other transport vehicle 100.

In general, turbine engine 200s 200 regulate gas flows (typically air flow 76) and chemical flow, along with employing combustion, to generate thrust. In a time and spatial sequence events, a turbine engine 200 200 increases air pressure via compressors 300, combines the fuel with compressed air in a combustion chamber 30, ignites/explodes the fuel/air mixture (also in the combustion chamber 30), and then releases the heated exhaust at reduced pressure via the turbine sections 32, 34, 36 and exhaust chamber 38. This process generates thrust for the vehicle 100, and also powers various rotary components (such as generators 400.1) to provide additional power and services for the vehicle 100.

Compressor, Air Pressure, and Engine Stall: The engine module that first accepts the incoming air is the intake fan 40, 42 followed immediately by the compressor 300 (which may be a multistage compressor 302, 304). A crucial aspect of turbine engine 200 operations is that, during intake, and in spatial and time progression of the air from fore to aft, the ambient air pressure must increase. Somewhat in analogy to riding a bicycle up a hill, it is never good to "go backwards", that is, it is undesirable to have at any point a decrease in air pressure going from fore to aft (until after the combustion process). Should the air pressure actually fall at any point along with progress of the air through the compressor 300, the engine 200 will stall, that is, completely lose power, which can lead to fatal outcomes for an aircraft 100.

To prevent engine stalls, legacy engines 200 employ sensing of engine operational conditions to modify the operations of the turbine engine 200s 200.

Engine Monitoring/Sensing and Real-time Engine Performance Changes: All contemporary engines (not just turbine engine 200s, but automotive engines and other combustion powered sources) contain electronic sensors which monitor the performance and environment of the engine. While aircraft engine sensors not shown in the figures, they are present at multiple points throughout an aircraft engine 200, and may monitor a variety of parameters and phenomena, including for example and without limitation: air speed at multiple points throughout the engine, temperature (T) of the air at multiple points through the engine, engine part rotation speeds, engine part temperatures, and air pressures at multiple points throughout the engines. Such measurements are typically made frequently or continuously throughout the time of flight of an aircraft 100.

Prognostic Health Monitoring System (PHMS): A turbine engine 200 200 ages with time, so that some sensed values may be particularly useful as long-term measures of engine health. A prognostic health monitoring system 119 (PHMS), which may be an element of an engine controller 110 or be a separate engine part element in conjunction with the engine controller 110, and may be implemented as a dedicated controller chip (for example, PROM), or may be software or firmware which is stored in controller memory 112 and executed by the processor 115 of engine controller 110. The PHMS 119 may detect, evaluate, and process various health-indicative sensed conditions which may include, for example and without limitation:

- P1 and P3: These are sensed air pressures at the fore 14 and aft 16 stages of the engine compressor 300. P1 vs. P3 (or P3−P1) is therefore a measure of the change in pressure across the turbine from fore to aft.
- ITT: Inner Turbine Temperature (T). The turbine heat causes metallic deterioration over time, which in results in decreased generation/extraction of high pressure from the compressor 200 (decreased values over time for P3−P1).
- NGR: This is a corrected core rotations speed for the turbines, as corrected with respect to air speed. As a turbine engine 200 200 degrades over time, the NGR will typically need to increase to produce a given pressure.

Aircraft Optimization Based On Engine Performance: As noted above, legacy systems employ PHMS 119 data to modify engine operations as needed to prevent stall conditions. The present system and method improves on legacy operations in multiple ways, which include for example and without limitation:

(i) Reducing the power demands on the engines 200 by making adjustments to a variety of aircraft systems other than the engines (ASOTE) 400 (including for example the demands of various aircraft systems for electrical power); and (ii) Dynamically modifying, over time, the threshold criteria (such as engine operating lines 530) which determine when the aircraft engines 200 are at risk of stall, the threshold modifications over time being indicative of declining engine performance with use.

V. Exemplary Method for Modifying Real-Time Aircraft Power Demands

In some embodiments, the present system and method entails modifying real-time aircraft power demands in response to sensed environmental circumstances which may increase flight demands on the engines 200.

Gas turbine engine 200s 200 operate by regulating a chemical flow (of jet fuel) and oxygen in the air to generate thrust and to generate electrical power within the engine. A sequence of pressure increases in the forward (aft) part of the engine 200, typically through a multistage compressor 300, raises the pressure of external air drawn into the engine. Further aft, the pressurized air is mixed with the jet fuel in the combustion chamber 30 and a spark (electrical energy) is applied, resulting in the explosion of the fuel and air. This explosion provides thrust, as well as providing rotational power for one or more electrical generators 400.1. It will be noted that the electrical generators 400.1 contribute to the power demands on the engine 200.

In some embodiments of the present system and method, an analysis of the real-time performance of one or more aircraft engines 200 during the flight time of an aircraft 100 may indicate that the demands on an engine 200 are at or approaching a maximum transient operating line 530. This puts the engine at risk of an engine stall.

Aircraft aging responses: The present system and method evaluates the whole system loads (from all components of an aircraft 100) on the engines 200, and rebalances the maximum allowed loads (represented by a maximum transient operating line 530) over a significant engine degradation time based, on the downward trend 595 of engine performance over significant engine degradation. This aspect of the present system and method is discussed further in conjunction with FIGS. 5A-5C and other figures below.

Real-time (In-Flight) Aircraft System Power Adaptions: The present system and method also provides for real-time reductions in the overall power demands during the flight duration of the aircraft 100, via either of: (i) providing instructions to the aircraft pilot for manual load adjustments; or (ii) automating the process of managing the loads, thereby taking some of the load management work away from the pilot. As is well-known in the art, a flight duration or flight time of an aircraft 100, for a single flight, is typically on the order of hours (for example, half an hour, one hour, or between one and twenty-four hours, though longer flight durations may be envisioned).

Legacy aircraft systems adjust the engine performance in response to engine aging. There are design and historical reasons for this legacy limitation. In most aircraft (especially commercial aircraft but also military aircraft), there are entirely separate designer teams for the engines 200 versus the aircraft 100 as a whole. (Often the engines and aircraft are designed and built by entirely separate corporate entities, where the aircraft designer purchases the engines from an engine builder.) The practical result is a lack of completely integrated and automated control of the engines in combination with the aircraft. A significant part of the work determining power load adjustments, in response to demands on the engines, is left to the pilots.

In an embodiment, the present system and method automatically determines the broader power loads on the entire aircraft system 100 via the controllers 105, 110. Those broader power loads include electrical power drawn from the engines 200, which reduces the available pressure in the engines and puts an engine compressor close to the stall margin 580 and the maximum transient operating line 530. The present system and method provides control elements and means to limit the overall power loads on the aircraft 100 so that those loads remain within safe power limits.

In some embodiments, the present system and method further functions to determine the broad deterioration trends 595 on the engines over a significant engine degradation time. The system and method may make the pilot(s) aware of the reductions in power over time, so that pilots and mission planners can rebalance the engine loads over significant engine degradation times (such as over months or years). The present system and method further makes the aircraft avionics 105 aware of the need to reduce power demands on the engines 200 as the aircraft ages. Put another way, the present system and method automates the process of managing aircraft-wide power loads in response to aging engines.

Integrated aircraft control: Full integration of engine control with whole aircraft control requires digital controllers 110 for both the engines 200 and the aircraft 100 as a whole. In many previous legacy aircraft, particularly turboprop jet engines (typically used in business and aviation planes), the controlling mechanism for engine acceleration and propeller pitch is a hydro-mechanism (liquid line or pneumatic based control). Full integration of the control of the aircraft 100 and the engines 200 requires that the engines 200 have a Full Authority Digital Engine Control (FADEC) 110. A FADEC 110 enables digitally monitoring and trending of the engine 200 via the controller 110. A FADEC 110 also enables detailed data and control exchange with other aircraft avionics and controllers 105.

Figure 4B:
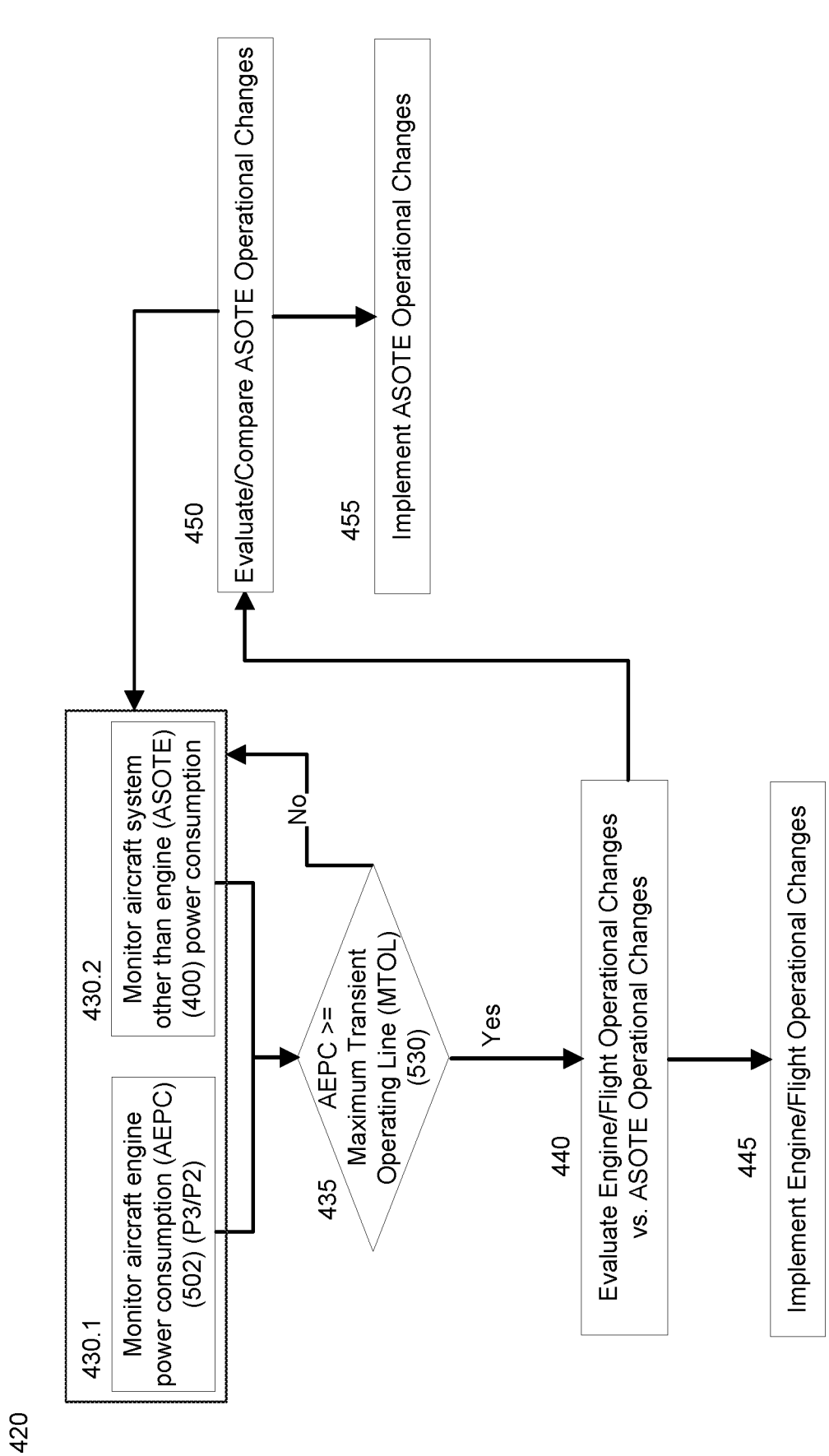
FIG. 4B illustrates an exemplary method for managing aircraft power consumption during flight.

FIG. 4B is a flowchart of an exemplary method 420 for managing aircraft power consumption to maintain safe limits and prevent engine stalls from occurring. The method may be implemented, for example and without limitation, via computer code which is stored in a tangible medium on the aircraft 100 and executed via one or more processors of the FADEC 110 and/or the processors of other aircraft avionics and controllers 105.

The method beings with step 430, a monitoring step, which may encompass two processes running substantially in parallel. In step 430.1, the method monitors aircraft engine power consumption (AEPC) 502 in real-time (that is, during flight), and/or values which may serve as a proxy for AEPC 502. For example, one measure of aircraft power consumption 502 may be the ratio of P3/P2. In parallel, in step 430.2, the method monitors power consumption of aircraft systems other than the engine (ASOTE) (400). While not illustrated in the flowchart 420, additional, concurrent, ongoing monitoring may entail measuring environmental and operational conditions of and around the aircraft 100, including speed, altitude, atmospheric conditions, and other data which pertain to the loads the aircraft 100 is experiencing and is anticipated to experience in upcoming minutes of the flight. Data for other factors, such as anticipated or desired flight path and intended flight speed, may be gathered as well.

The method 420 continues with step 435. In step 435, the method evaluates whether the power demands on the engines 200 are nearing, are at, or possibly are exceeding the maximum transient operating line (MTOL) 530, which indicates the maximum power that can be safely demanded from the engines 200 without risk of stall. As discussed elsewhere in this document, the present system and method may modify the maximum transient operating line 530 over extended periods of time (weeks and/or months), generally in a downward trend 595 as a result of routine engine wear and tear. This means that the MTOL may be adjusted over weeks or months. However, at a given time and for shorter stable time durations (for example, for the duration of a single flight, and possibly over multiple successive flights), the MTOL 530 is generally pre-determined as a well-defined, stable threshold for the flight duration(s).

If in step 435 the AEPC 502 is below the MTOL 530 (that is, AEPC<MTOL), the method continues with the monitoring 430.

If in step 435 the MTOL 530 is above the AEPC 502 (that is, AEPC>=MTOL), the method continues with steps 440, which evaluates possible modifications to engine operations and/or overall aircraft operations. The possible modifications are intended to reduce power consumption by the engines 200, and/or to modify engine operations to increase engine efficiency. The step 440 may evaluate, for example, whether current power demands can best be addressed by changes to engine operations (as in step 445) or changes to other aircraft power demands (steps 450/455). Step 440 may determine that some combination of changes to engine operations (step 445) and changes to other aircraft power consumption (steps 450/455) may be the optimal choice to reduce the current aircraft engine power consumption 502.

In step 455, the present system and method implements necessary changes to operations of the engines proper to reduce power consumption of the engines 200 or to optimize the transient performance of the engines 200. The details of such changes are beyond the scope of this document.

In some embodiments, as shown in the flow chart 420, step 445 (modifying engine operations) may precede steps 450 and 455 (modifying other aircraft operations); however, that ordering is exemplary only. In alternative embodiments, steps 450/455 may precede steps 440, and in other embodiments step 445 and steps 450/455 may occur substantially in parallel and possibly in coordination with each other. Further, step 440 may occur partly or substantially in parallel with some aspects of steps 445, 450, and 455.

In step 450, the method 420 evaluates various possible operations to the current activities of aircraft systems other than the engines (ASOTE) 450. Since the ASOTE 450 generally require electrical power, reductions in power consumption by the ASOTE 450 will result in reduced power demands on the aircrafts generators 400.1, and therefore reduced power demands on the engines 200. In embodiments, the evaluations may entail consideration of both the system-wide power reductions which may be obtained by altering or reducing operations of various ASOTE 400; and also consideration of various vehicle safety and passenger comfort priorities which may be established (by system engineers or aircraft operators) for the ASOTE 400. Possible changes to operations of ASOTE 400, which may be evaluated, may include, for example and without limitation:

Modifying the air pressure operations of various air bleed systems 400.2;

Limiting the operations of the foreign object door (FOD) 400.3, since maximum operation of the FOD 400.3 reduces available engine pressure and power;

Temporary reductions of power available to various interior cabin passenger support systems 400.4;

Changes to current aircraft speed, ascent or descent angle, or changes to anticipated course 400.5;

Temporary changes or limitations some aspects of operations of aviation electronics, for example powering down non-essential systems;

Drawing extra power or reserve power from aircraft batteries (not shown in the figures).

In step 455, the method 420 implements or executes one or more selected, temporary operational changes to the functions of the ASOTE 455. It will be noted in this context that in some practical applications, "temporary" operational changes may be sustained at least through the duration of a flight (that is, through the safe landing of the aircraft). In other cases, temporary operational changes may only be in effect during part of a flight.

Further regarding aircraft systems other than the engines (ASOTE) 400: While the discussion above has distinguished between engine/flight operational changes versus changes to the operations of ASOTE 400, it will be noted that some alternations to flight activity may potentially be viewed as falling at least partly into both categories. For example, changes to flight velocity proper may be obtained simply by reducing fuel supplied to the engines, which may be viewed as part of modifying engine operations. However, changes in course path and/or altitude (which may reduce the power demands on the engines) may require changes both to airspeed and also to wing flaps, rudder, and trim tabs, which are not part of the engines. In general, and as understood in this document and in the appended claims, changes in operations of the ASOTE 400 are to be understood as changes to aircraft operations which reduce demands on engine pressure, and/or optimize air compression in the engines, without requiring direct control or alternation of the operations of internal engine components, for example those shown in exemplary engine 200 of FIG. 2 and exemplary turbine 300 of FIG. 3. As noted above, the FOD door 400.3 and air bleed systems 400.2 are considered to be parts of the aircraft systems other than the engines 400.

Anticipatory Power Demand Processing: In an alternative embodiment, step 435 above—the step of determining that the demand for engine power 502 exceeds the maximum transient operating line 530—may be an anticipatory step. This means that the present system and method may evaluate a current or recent trend in power consumption and engine performance during the current flight; and may further evaluate anticipated additional power demands in upcoming minutes of the flight (for example, extra power required to climb over upcoming storm clouds). Step 435 may then anticipate that while current engine power consumption 502 is less than the MTOL 530, it is anticipated that upcoming flight demands are likely to increase the engine power consumption to be equal to our greater than the MTOL 530. The present system and method can then implement actions, or recommend actions to the pilot, to mitigate the expected change in power demands. For example, the present system and method may recommend to the pilots that they change their route to navigate around an upcoming storm, rather than attempt to climb over the storm.

VI. Adjustments to Engine Power Consumption Thresholds Over Time

In some embodiments, the present system and method makes adjustments over time to threshold values for maximum jet engine power consumption. These adjustments are made responsive to sensed deterioration in aircraft engine performance over extended periods of operation time (typically, variations over weeks, months, and years). In some embodiments, the time frames for the threshold value adjustments may be shorter, such as during the duration of a single flight.

The threshold values are system-established limitations on the amount of power which may be drawn from the engines without incurring undue risk of engine stall. In some embodiments, the present system and method adjusts the threshold values for a maximum operating line 530 for the engines. Details are discussed immediately below. For purposes of this document and the appended claims, the following terms are deemed equivalent: "operating line", "operating power", "operating load", and "operating HPx". For example, the terms "maximum transient operating line 530", "maximum transient operating power 530", "maximum transient operating load 530" and "maximum transient operating HPx" are deemed equivalent terms. For another example, the terms "allowed operating line", "allowed operating power", "allowed operating load" and "allowed operating HPx" are deemed equivalent terms.

VII. Legacy Stall Map (Compressor Map)

Figure 5A:
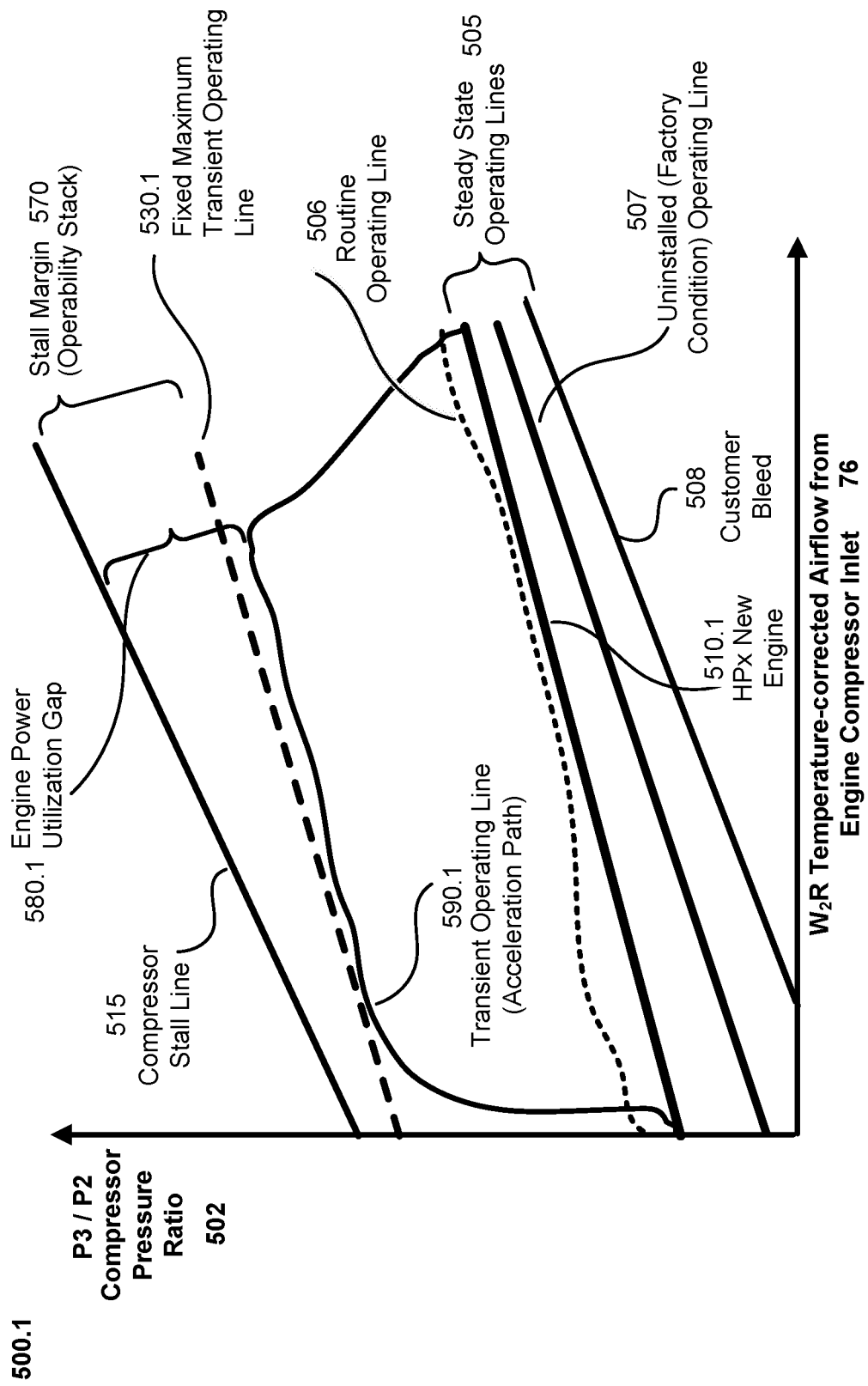
FIG. 5A presents an exemplary compressor map (referred to equivalently herein as a stall map 500) which may be used by an engine controller in legacy systems.

FIG. 5A presents an exemplary legacy compressor map 500.1, referred to equivalently herein as a stall map 500, which may be used by the controller 110 to operate the engines 200, and which can be stored in the memory 112. Persons skilled in the relevant arts will appreciate that while the map 500 is illustrated in graphical form, this is for convenience only; the compressor map 500 can be stored in the memory 112 in the form of data tables, equations, and/or other digital representations known in the art.

The compressor map 500.1 plots the compressor pressure ratio 502 (P3/P2) as a function of corrected compressor flow 76. Pressure (typically measured in psi in the U.S.) determines the ability of an air compressor 300 to perform a certain amount of work at any given point in time. Flow 76 is indicative of the ability of an air compressor to continuously perform a task (such as pressuring air sufficiently to generate required thrust in a jet engine 200). In the U.S., air flow 76 is typically measured in cubic feet per minute (cfm) at a specific pressure, and can be viewed as "how fast" the air flows past a given point in a compressor 300.

The compressor map 500 may include storage of data representations for a surge line 515, a maximum operating line 530, and a stall margin 570. As used herein, "surge line" 515 will refer to the pressure ratio 502 wherein the airflow 76 through the engine 200 can break down or become unstable, causing an engine stall; and "operating line" 530 will refer to the operating pressure ratio 502 which can safely be below that of the surge line. In addition, "pressure ratio" 502 can refer to any of the following in non-limiting examples: the ratio 502 (=P2/P3 or =P3/P2) of air pressures taken at the inlet and outlet of the compressor section 300, the ratio 502 of air pressures taken at the inlet and outlet of the compressors 304, 306 individually, or the ratio 502 of air pressures taken at any two locations within the compressor section 300 as desired such as the exemplary P2, P3 measurement locations shown in the figure.

Stall Margin: The compressor stall margin 570 can be defined as the difference between the compressor stall line 515 and the operating line 530; it will be understood that the percent difference between the surge line 515 and operating line 530 can also be used to define the stall margin 570. In legacy systems, the operating line is pre-set as a fixed-value for a maximum safety factor stall margin; the fixed-value is calculated before the engine 200 or aircraft 100 are even put into service, and is calculated based on the assumption of worst case operating conditions for the aircraft. This leads to a corresponding large stall margin 570.1. All things being equal, the greater the stall margin 570.1, the less efficiently the engine 200 is operating.

Uninstalled (Factory Condition) Operating Line 507: The uninstalled operating line 507 reflects the P3/P2 ratio for the engine 200, and therefore the power generated by the engine 200, if the engine is brand new, not installed as part of the aircraft 100, and was run for example as part of ground-based testing, that is, with no load on the engine 200. This can also be understood as the horsepower generated by the engine 200 under the same (ground-based, testing-only) conditions.

Customer Bleed 508: This line represents compressor flow exhausted (bled) from a port on the engine compressor 102 during normal operations by the aircraft when in routine flight, including but not limited to bleed flow drawn by the aircraft systems other than the engine (ASOTE) 400.

HPx New Engine (or simply HPx) 510.1: This line represents the power that is withdrawn from the engines 200 during normal operations by the aircraft when in routine flight, including but not limited to electrical power drawn by the aircraft systems other than the engine (ASOTE) 400.

Acceleration and the Transient Operating Line 590.1: In the course of normal operations, and even more so under stressed operating conditions, an aircraft 100 will sometimes need to accelerate. This places increased power demands on the aircraft 100. An exemplary transient operating line 590.1 represents a power consumption by the engines 200 during acceleration. The word "transient", as employed here in the phrase "transient operating line", is indicative of the fact that the increased power demands on the engine 200 and compressors 300 are typically expected to be relatively transient in time or of brief duration, present only during aircraft acceleration or other flight stresses which increase power demands on the aircraft 100. At other times during a flight, the power demands on the engines 200 (as reflected by a real-time operating line) are expected to be at or near the power demands reflected by the steady-state operating lines 505, as indicated by routine operating line 506 for routine, level, and/or unaccelerated periods of a flight.

It will be evident from FIG. 5A that during acceleration the power consumption increases significantly compared to the power consumption in routine, steady state flight 510.1. Further, persons skilled in the art will appreciate that as an engine 200 ages and degrades in the normal course of use over time, and for a given level of operational demands on the aircraft 100, the transient operating line 590.1 will have higher values.

Optimally, and while maintaining aircraft safety (by not risking an engine stall) the power demands on the aircraft 100 could be made high enough to raise transient operating line 590.1 to just below the compressor stall line 515. In legacy aircraft however, and as noted above, a maximum transient operating line 530.1 is established in anticipation of engine aging. The maximum transient operating line 530.1 is established at a fix value at the time the aircraft engine 200 is built or installed, resulting in a large stall margin 530.1 from the outset of engine usage. As a further result, and in the course of normal flight, there is a large amount of underuse of available engine power during the early and midlife periods of the engine. This is shown in the figure as an engine power utilization gap 580.

VIII. Adjustable Stall Map (Optimized Compressor Map)

It is a goal of the present system and method to optimize the stall margin 570 and the engine power utilization gap 580 over the course of engine life. This results in more efficient utilization of the engines 200, with concomitant resource and cost savings, while still maintaining safe (stall-free) flight operations.

Figure 5B:
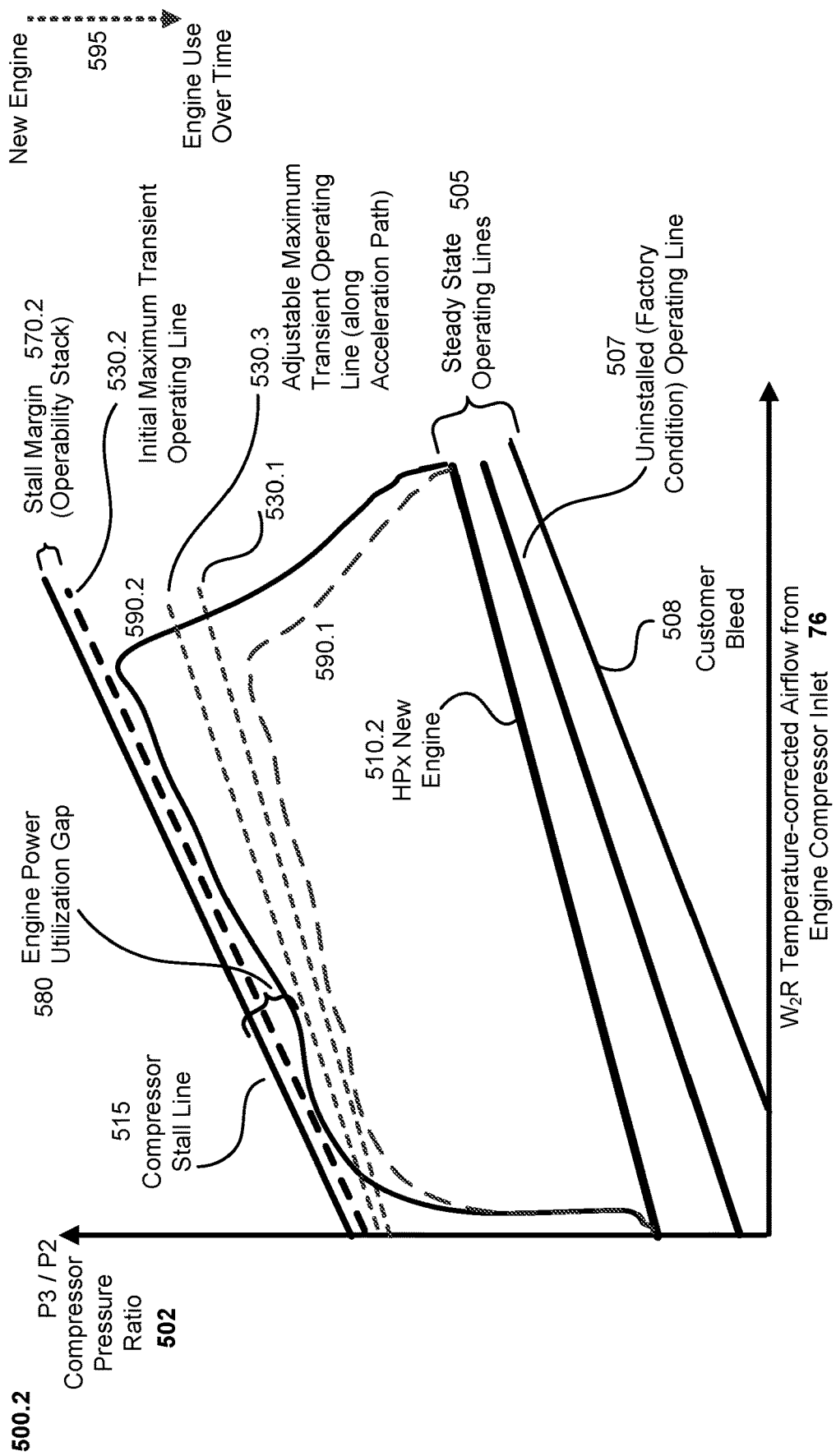
FIG. 5B presents an exemplary compressor map (referred to equivalently herein as a stall map 500) which may be used by an engine controller according to the present system and method.

FIG. 5B presents an exemplary compressor map 500.2, referred to equivalently herein as a stall map 500.2, which may be used by the controller 110 to operate the engines 200 according to the present system and method. Many of the elements of stall map 500.2 are the same or similar to those of the stall map 500.1 of FIG. 5A above, and the details will not be repeated here.

The compressor map 500.2 may be understood as implicitly representing multiple maps 500, the multiple stall maps being indicative of engine performance at different times (possibly weeks apart, months apart, or even years apart) in the life cycle of the engines 200.

Initial Maximum Operating Line: The Initial Maximum Transient Operating Line 530.2 represents an allowed power demand on the engine compressors 300 when the engines 200 and/or aircraft 100 are first operational, and operating at factory-fresh or near factory-fresh efficiency. Because the engines 200 and/or aircraft 100 are new, this is viewed as a safe operating line 530 for the engines 200, compressors 300 and aircraft 100 is the initial or early stages of use. As may be seen in the figure, and according to embodiments of the present system and method, the initial maximum transient operating line 530.2 is set to be very close to the compressor stall line (515). To maintain a safety margin against stalls, the initial maximum transient operating line 530.2 may be set at slightly below the values of the compressor stall line 515. For example, in various exemplary embodiments, the P3/P2 values of the initial maximum transient operating line 530.2 may be set to 99%, 98%, or 95% of the values on the stall line 515 (for corresponding W2R values along the X-axis). In other embodiments, other percentages, close-to-but-not-at 100%, may be envisioned as well.

Time-Adjusted Maximum Operating Line: Over time, the present system and method detects, via sensors 310, declines in engine performance due to routine engine wear-and-tear. In response to sensed declines in engine performance, such as reduced P3/P2 ratios or more generally reduced power output over time (the time frames typically being weeks, months, or years, though shorter times may be envisioned), the controller 110 calculates an adjusted maximum transient operating line 530.3.

With successive such adjustments and calculations reflecting an extended use-life of the engines 200, the adjusted maximum transient operating line 530.3 will typically show a downwards trend 595 (typically approaching the fixed maximum transient operating line 530.1 (see FIG. 5A)). However, because particular engine usage and aircraft usage varies from aircraft to aircraft and from engine to engine, some engines 200 will maintain over time a better than expected power output. As such, even as a particular engines 200 ages, it's adjusted maximum transient operating line 530.3 may still permit greater power demands on the engine 200 than the fixed maximum transient operating line 530.1 of legacy systems.

Engine or Compressor End-of-Life: In some embodiments of the present system and method, a fixed maximum transient operating line 530.1, based on historical and/or calculated worst-case engine-use scenarios, may still be stored in memory 112. (Historical lines 530.1 would be based on the history of decline of other engines of the same design or similar design, as measured in actual operation over time.)

Over an extended period of engine usage, as the adjusted maximum transient operating line 530.3 approaches the fixed maximum transient operating line 530.1 (as indicated by some threshold difference level defined by system engineers or by aircraft engineers), the controller 110 of the present system and method may issue a warning or alert. The warning or alert may indicate a need for urgent engine maintenance, or more generally may indicate that the engine 200 and/or compressor 300 may be nearing the end of useful operational life.

Efficiency Benefits: As may be seen in FIG. 5B, during the early operational life of the engine 200—when the maximum transient operating line is very close to or substantially close to the compressor stall line 515—the stall margin 570.2 is very small compared to, for example, the fixed and larger stall margin 570.1 of legacy systems. This smaller stall margin can be established within safety limits, and as a result a transient operating line 590.2 may safely place great power demands on the engine 200, as compared for example to the transient operating line 590.1 of legacy systems. This results, in both early- and mid-life stages of the engine 200, in more efficient use of the engines, more efficient use of fuel, and also in the safe use of greater reserve power in emergency situations.

Adaptable Operating Line and Significant Degradation Time: In some embodiments of the present system and method, and as noted above, the controller 110 employs data from sensors 310 to identify declines in engine power and performance due to routine engine wear-and-tear, and particularly due to degradation over time of the compressor 300. In response to sensed declines in engine performance, such as reduced P3/P2 ratios or more generally reduced power output over weeks, months, and/or years, the controller 110 calculates an adjusted maximum transient operating line 530.3. Based on general historical experience with engines, experience with engines of a same or similar design, computer simulations of engine performance, and factory testing, design engineers may determine for an engine 200 a significant engine degradation time (SEDT), or equivalently "significant degradation time (SDT)" or "engine degradation time (EDT)".

The significant degradation time (SDT) may be a time period, such as a minimum time period or an average time period or similar, when the engine 200 may be expected to display sufficient physical or structural degradation so as to meaningfully impact (and generally reduce) engine thrust and power. As indicated above, such time periods may typically be on the order of weeks or months, but in some cases longer or shorter periods. Generally, system design engineers or aviation engineers will define the criteria for a meaningful rebalance in engine power extraction for electrical load, which may in some embodiments be a 0.5% reduction in engine power extraction, a 1% reduction in engine power, or other reductions such as 2%, 5%, or 10%. The change may also entail maintaining the same level of engine power extraction for electrical load while increasing compressor bleed extraction for aircraft use to rebalance overall load on the engine compressor. In embodiments, the present system and method will be configured to adapt or adjust an engine's maximum transient operating line 530.3 at time intervals no longer than the SDT. In alternative embodiments, the present system and method may recalculate or adjust an engine's maximum transient operating line 530.3 when a stored data log of engine performance indicates a specified reduction over time in engine performance (for example, a 0.5% reduction in engine power or compression ratio, a 1% reduction in engine power or compression ratio, or other reductions such as 2%, 5%, or 10%). Typically, this will result in the maximum transient operating line 530.3 being recalculated and updated at least at time intervals of the significant degradation time (SDT), and possibly more often.

Figure 5C:
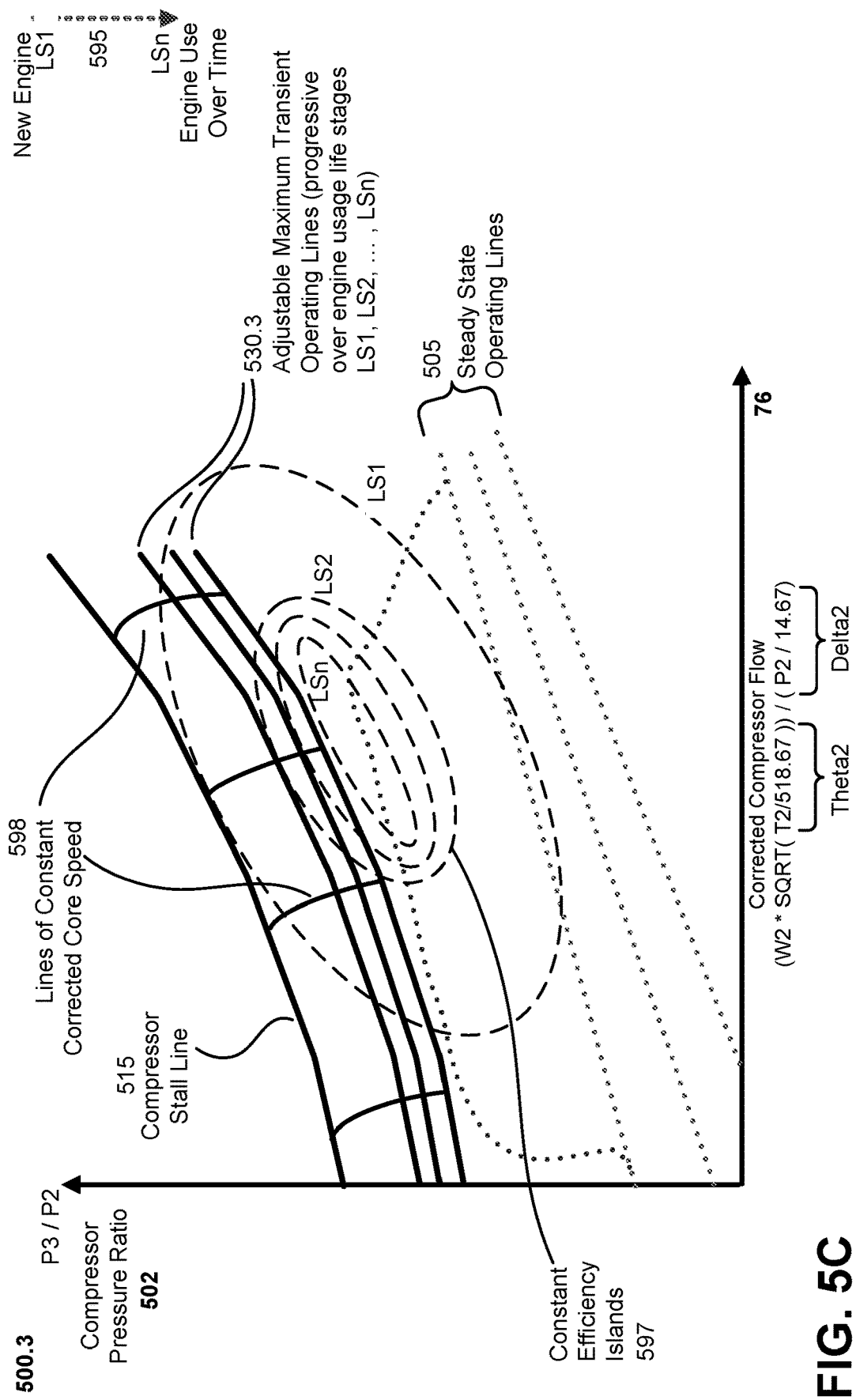
FIG. 5C presents an exemplary map which illustrates how a maximum operating line for an engine may be updated over the lifetime of an engine or aircraft, according to the present system and method.

FIG. 5C presents an exemplary compressor map 500.3 which illustrates some aspects of an exemplary method to establish an adjusted maximum transient operating line 530.3.

As above, the compressor map 500.3 plots the compressor pressure ratio 502 (P3/P2) as a function of corrected compressor flow 76. The compressor flow 76 is a corrected flow, for which a suitable formula is identified in the course of development of the engine 200 and compressor 300. In one embodiment, which is exemplary only and non-limiting, the corrected compressor mass flow ratio is calculated and plotted as:

$$CCF = (W2 * SQRT(T2/518.67))/(P2/14.67)$$

where:
W2=air flow rate at the point where P2 is measured;
T2=the temperature at the point where P2 is measured; and
P2=the air pressure.

An exemplary, non-limiting method for obtaining a maximum transient operating line 530.3 is presented here. It will be noted that this method may be repeated periodically, for example at designated intervals of weeks or months, to adjust the maximum transient operating line 530 for the engine. The method may also be employed at other times, for example when pilots, other aircraft specialists, or software have identified periods of time when the aircraft 100 and its engines/compressors 200/300 have been subject to greater than usual stresses. The steps of the method entail:

(1) Identifying lines of constant core speed, as corrected for temperature and pressure.

(2) Identifying, in the stall map, a region or "island" of constant efficiency 597. For a given period or life stage (LS) during the entire operational life of the engine 200 and compressor 300, an island of constant efficiency represents a phase space for compressor pressure ratio vs. compressor air flow where the engine/compress 200/300 exhibits constant efficiency. This determination is based on analysis of engine pressure, air flow, and power delivered by the engine 200, and a detailed discussion is beyond the scope of this document.

An island of constant efficiency 597 is expected to remain reasonably stable in size over shorter periods of engine usage and life (on the order of weeks or months), but will decline in area over the extended length of the useful operational lifetime of the engine 200 as represented in the figure by engine Life Stages 1, 2, . . . , n (LS1, LS2, . . . , LSn).

(3) A transient operating line 530 may, during a given life stage LS(k), be constructed from lines which are orthogonal to selected lines of constant speed and tangent to an upper boundary of the constant efficiency operating lines 597 as shown in the figure.

During the lifetime of the engine 200, data from the sensors 310 is used as a guide to update the transient operating line 530 for an engine. In this way, when an engine 200 is new the aircraft 100 can take full and most efficient advantage of the high engine efficiency; as the engine ages and its efficiency is reduced in the normal course of operations, power demands on the engines can be suitably rebalanced during progressive engine Life Stages LS(k) to ensure engine operations and thrust remain within safe limits (so as to avoid engine stalls).

IX. Further Embodiments

The present system and method leverages prognostic health management (PHMS) 119 tools to assess deterioration levels on turbine engine 200s such as the GE Catalyst engine. In one embodiment, once a predefined level of engine deterioration is surpassed, the FADEC 110 will send a CAS message to alert the pilot regarding potential limitations on HPx 510.1, ECS bleed, ability to deploy FOD doors 400.3, or minimum aircraft speed at the altitude ceiling to avoid risk of stall.

More specifically, and in an embodiment: The present system and method utilizes PHMS 119 methods and tools such as (for example and without limitation) comparing torque sensor output to ITT, NGR, P1vsP3, as well as other parameters with License Required restrictions, to regularly monitor and analyze engine performance data, and further to create a deterioration trend. Embedded models or tracking filters maybe utilized to assess deterioration.

Analysis and trending could be on board the FADEC 110 or off board with updates back to the FADEC 110 at regular intervals. At some maximum, predefined threshold of deterioration, corresponding to a certain level of surge margin consumption, the pilot will be notified of potential actions to reduce surge risk based on operational procedures.

Such action procedures could include, for example and without limitation: (i) do not close ECS bleed from PL25 while utilizing max HPx 510.1; (ii) turn off/reduce HPx 510.1 prior to turning off ECS bleed; (iii) do not deploy FOD doors above a predetermined altitude ceiling while flying slower than a preset threshold; (iv) reduce cabin electrical consumption (for example, by limiting comfort or support services for passengers); (v) reducing other system-wide power consumption; or (vi) any combination of the actions above.

In some embodiments of the present system and method, if within a predefined window the pilot does not take necessary action, the FADEC 110 may impose automated limits on HPx 510.1 based on altitude and speed thresholds through direct communication with Starter Generator Power Control Unit (PCU) and notify the pilot of the pre-imposed limitations. These actions should provide more flexibility and optimization regarding the impact of extractions on Operability margin. They will allow for higher electrical load HPx 510.1 from the core while the engine is new (as compared to reduced electrical loads HPx 510.1 as the engines deteriorate with time).

In some embodiments of the present system and method, the step of pilot notification and pilot response time for action may be omitted. In such embodiments, the FADEC 110 may automatically impose designated various automated limits on HPx 510.1, and may or may not supply pilot notification as well.

Legacy technology sets an initial threshold (that is, fresh-off-the-engine production line) for engine power consumption, and therefore for maximum allowed stress on the engine compressors, based on the anticipated future wear, tear, and degradation of engine structure (in the ordinary course of use) over time. Such estimates of future decline in engine function necessarily take into account worst-case scenarios for the future use of the engines in the ordinary course of flight. The legacy approach therefore imposes significant limits on engine power consumption from the first day of use, when in fact new engines and moderately aged engines may have significant power to spare within the bounds of safety. Legacy engine monitoring systems also address declines or deficiencies in engine thrust over time by modifying internal operations of the engines.

The present system and method for aircraft optimization based on engine performance leverages PHMS 119 tools, as described throughout this document, to assess engine conditions over time, and further to optimize available power extractions to the unique, particular condition of an aircraft, the aircraft engines, and the aircraft engine compressors for each unique transport asset and its unique missions. The present system and method therefor enables more tailored engine capability, particularly in the early- and midlife-stages of an aircraft's deployment, instead of limitations imposed by the long-term, worst possible statistical case in the fleet. The present system and method further provides for adjusting a variety of aircraft systems and operations, including those which are not at all engine operations or which may be viewed as systems only peripheral to the engines, in order to reduce short-term engine power demands while in flight.

CONCLUSION

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

What is claimed is:

1. A computer-readable, non-transitory storage medium storing instructions that, when executed by a digital controller of an aircraft comprising a turbine engine causes the aircraft to execute a method comprising:
    storing in a memory of the digital controller an operating log of engine performance over an engine degradation time, the engine degradation time being a time period when the turbine engine is predicted to have reduced engine thrust or power because of engine degradation;
    calculating from the operating log a change in engine performance of the turbine engine over the engine degradation time;
    determining an allowed maximum operating power for the turbine engine in response to the change in engine performance of the turbine engine over the engine degradation time;
    determining changes in performance of the turbine engine over the engine degradation time based on changes in performance of a compressor of the turbine engine over the engine degradation time;
    determining changes in performance of the compressor based on changes in constant efficiency islands of performance on a stall map of performance of the compressor over time;
    determining at the digital controller, based on data received from the turbine engine during flight, that a load on the turbine engine exceeds the allowed maximum operating power; and
    upon determining that the load on the turbine engine exceeds the allowed maximum operating power, issuing a control command to an aircraft system other than the turbine engine (ASOTE) to rebalance a power load on the turbine engine.

2. The computer-readable, non-transitory storage medium of claim 1, wherein the method further comprises:
    storing in the memory of the digital controller at least one of a factory condition operating power for the turbine engine and a new jet aircraft operating power for the turbine engine, and
    determining the allowed maximum operating power for the turbine engine based on:
    the at least one of a factory condition operating power for the turbine engine and the new jet aircraft operating power for the turbine engine; and
    the change in performance of the turbine engine over the engine degradation time.

3. The computer-readable, non-transitory storage medium of claim 1, wherein the method further comprises calculating a corrected compressor mass flow ratio and using the corrected compressor mass flow ratio in determining the allowed maximum operating power for the turbine engine, wherein further comprises calculating a formula as follows is used in calculating the corrected compressor mass flow ratio: $(W2*SQRT(T2/518.67))/(P2/14.67)$, where W2 is air flow rate at a point where P2 is measured, T2 is a temperature at the point where P2 is measured, and P2 is air pressure.

4. A computer-readable, non-transitory storage medium storing instructions that, when executed by a digital controller of an aircraft comprising a turbine engine causes the aircraft to execute a method comprising:
    storing in a memory of the digital controller an operating log of engine performance over a engine degradation time, the engine degradation time being a time period when the turbine engine is predicted to have reduced engine thrust or power because of engine degradation;
    calculating from the operating log a change in engine performance of the turbine engine over the engine degradation time;
    determining an allowed maximum operating power for the turbine engine in response to the change in engine performance of the turbine engine over the engine degradation time;
    determining changes in performance of the turbine engine over the engine degradation time based on changes in performance of a compressor of the turbine engine over the engine degradation time;
    determining at the digital controller, based on data received from the turbine engine during flight, that a load on the turbine engine exceeds the allowed maximum operating power;
    upon determining that the load on the turbine engine exceeds the allowed maximum operating power, issuing a control command to an aircraft system other than the turbine engine (ASOTE) to rebalance a power load on the turbine engine; and
    determining the allowed maximum operating power for the turbine engine further comprises using data representing constant core speed, as corrected for temperature and pressure.

5. The computer-readable, non-transitory storage medium of claim 4, wherein the method further comprises:
    determining changes in performance of the compressor based on changes in constant efficiency islands of performance on a stall map of engine compressor performance over time.

6. The computer-readable, non-transitory storage medium of claim 4, wherein the method further comprises issuing a control command to the turbine engine so that values for a compressor pressure ratio versus compressor air flow are below the allowed maximum operating power for the turbine engine.

7. A computer-readable, non-transitory storage medium storing instructions that, when executed by a digital controller of an aircraft comprising a turbine engine causes the aircraft to execute a method comprising:
    storing in a memory of the digital controller an operating log of engine performance over a engine degradation time, the engine degradation time being a time period when the turbine engine is predicted to have reduced engine thrust or power because of engine degradation;
    calculating from the operating log a change in performance of the turbine engine over the engine degradation time;
    determining an allowed maximum operating power for the turbine engine in response to a change in performance of the turbine engine over the engine degradation time;
    determining changes in performance of the turbine engine over the engine degradation time based on changes in performance of a compressor of the turbine engine over the engine degradation time;
    determining at the digital controller, based on data received from the turbine engine during flight, that a load on the turbine engine exceeds an allowed maximum operating power;

upon determining that the load on the turbine engine exceeds the allowed maximum operating power, issuing a control command to an aircraft system other than the turbine engine (ASOTE) to rebalance a power load on the turbine engine; and calculating a corrected compressor mass flow ratio and using the corrected compressor mass flow ratio in determining the allowed maximum operating power for the turbine engine, wherein a formula as follows is used in calculating the corrected compressor mass flow ratio: (W2*SQRT (T2/518.67))/(P2/14.67), where W2 is air flow rate at a point where P2 is measured, T2 is a temperature at the point where P2 is measured, and P2 is air pressure.

8. The computer-readable, non-transitory storage medium of claim 7, wherein the method further comprises:

issuing a control command to the ASOTE to reduce modify or limit an operation of the ASOTE, wherein the modified or limited ASOTE operation rebalances electrical load on an electrical power generator which is driven by the turbine engine.

9. The computer-readable, non-transitory storage medium of claim 7, wherein the engine degradation time includes time data representing expected structural degradation of the turbine engine that meaningfully impacts performance of the turbine engine.

10. The computer-readable, non-transitory storage medium of claim 7, wherein the engine degradation time is a fixed time based on a type of turbine engine.

11. The computer-readable, non-transitory storage medium of claim 7 wherein the engine degradation time is based on a predetermined amount of reduction over time in turbine engine performance.

12. The computer-readable, non-transitory storage medium of claim 7 wherein the engine performance includes measuring a change in pressure across the turbine engine from fore to aft.

13. The computer-readable, non-transitory storage medium of claim 12 wherein the engine performance includes measuring core rotation speeds of the turbine engine.

14. The computer-readable, non-transitory storage medium of claim 12 wherein the engine performance includes measuring inner turbine temperatures of the turbine engine.

15. The computer-readable, non-transitory storage medium of claim 12, wherein issuing the control command to the ASOTE comprises issuing a command to modify an aircraft speed or an aircraft angle of ascent or descent to reduce a thrust demand on the turbine engine.

* * * * *

UNITED STATES PATENT AND TRADEMARK OFFICE
CERTIFICATE OF CORRECTION

PATENT NO.        : 12,291,344 B2
APPLICATION NO.   : 18/410493
DATED             : May 6, 2025
INVENTOR(S)       : Mehdi M. Baladi et al.

Page 1 of 1

It is certified that error appears in the above-identified patent and that said Letters Patent is hereby corrected as shown below:

In the Claims

In Column 23, Claim 3, Line 61, delete "wherein further comprises calculating" and insert -- wherein --, therefor.

Signed and Sealed this
Twenty-ninth Day of July, 2025

Coke Morgan Stewart
*Acting Director of the United States Patent and Trademark Office*